(12) United States Patent
Nielsen et al.

(10) Patent No.: US 11,156,210 B2
(45) Date of Patent: Oct. 26, 2021

(54) METHOD AND SYSTEM FOR PERFORMING MAINTENANCE ON ROTOR BLADE OF A WIND TURBINE ROTOR

(71) Applicant: LM Wind Power US Technology ApS, Kolding (DK)

(72) Inventors: Finn Kjaer Nielsen, Kolding (DK); Morten Philipsen, Kolding (DK)

(73) Assignee: LM WIND POWER US TECHNOLOGY APS, Kolding (DK)

( * ) Notice: Subject to any disclaimer, the term of this patent is extended or adjusted under 35 U.S.C. 154(b) by 108 days.

(21) Appl. No.: 16/341,245

(22) PCT Filed: Oct. 19, 2017

(86) PCT No.: PCT/EP2017/076726
§ 371 (c)(1),
(2) Date: Apr. 11, 2019

(87) PCT Pub. No.: WO2018/073349
PCT Pub. Date: Apr. 26, 2018

(65) Prior Publication Data
US 2019/0316568 A1 Oct. 17, 2019

(30) Foreign Application Priority Data
Oct. 20, 2016 (EP) .................................. 16194856

(51) Int. Cl.
*F03D 80/50* (2016.01)
*F03D 80/40* (2016.01)

(52) U.S. Cl.
CPC ............. *F03D 80/50* (2016.05); *F03D 80/40* (2016.05); *F05B 2230/80* (2013.01)

(58) Field of Classification Search
CPC ................................. F03D 80/50; F03D 80/40
See application file for complete search history.

(56) References Cited

U.S. PATENT DOCUMENTS 6,890,152 B1   5/2005  Thisted
8,062,431 B2 * 11/2011 Kumar .................... B08B 3/022
                                                            134/10

(Continued)

FOREIGN PATENT DOCUMENTS

EP    2719892 A1    4/2014
WO    9801340 A1    1/1998
WO    2015065873 A2 5/2015

*Primary Examiner* — Michael L Sehn
(74) *Attorney, Agent, or Firm* — Nath, Goldberg & Meyer; Jerald L. Meyer; Tanya E. Harkins

(57) ABSTRACT

Methods for performing maintenance on a rotor blade of a wind turbine rotor comprising at least a first rotor blade with an airfoil body formed from a blade shell element, the airfoil body having a suction-side surface and a pressure-side surface, a leading edge and a trailing edge, and a root end for mounting to a wind turbine hub and a distal tip end are disclosed, as well as a related system for same. The method comprising the steps of bringing the wind turbine rotor to a standstill, introducing a mobile maintenance device into said first rotor blade at the blade root, moving said mobile maintenance device inside said first rotor blade to a location, performing a maintenance operation at the location with said mobile maintenance device, and removing said mobile maintenance device from said first rotor blade.

19 Claims, 9 Drawing Sheets

(56) References Cited

U.S. PATENT DOCUMENTS

| | | | |
|---|---|---|---|
| 8,092,151 B2 * | 1/2012 | Becker | F03D 80/40 |
| | | | 415/112 |
| 8,281,442 B2 * | 10/2012 | Eggleston | B08B 1/02 |
| | | | 15/3 |
| 2013/0149145 A1 | 6/2013 | Shibata et al. | |
| 2015/0275863 A1 * | 10/2015 | Betran Palomas | F03D 80/50 |
| | | | 416/146 R |

* cited by examiner

METHOD AND SYSTEM FOR PERFORMING MAINTENANCE ON ROTOR BLADE OF A WIND TURBINE ROTOR

This is a National Phase Application filed under 35 U.S.C. 371 as a national stage of PCT/EP2017/076726, filed Oct. 19, 2017, an application claiming the benefit of European Application No. 16194856.7, filed Oct. 20, 2016, the content of each of which is hereby incorporated by reference in its entirety.

FIELD OF THE INVENTION

The invention relates to a method and a system for performing maintenance on a rotor blade of a wind turbine rotor.

BACKGROUND OF THE INVENTION

Wind turbines are in increasing numbers being erected all around the world in areas with different climates. Some aspects of a given climate may affect wind turbines and especially the surfaces such as rotor blade surfaces. Well-known examples are insects, dirt and similar airborne objects which are deposited over time on the rotor blade surfaces. Ice may also form on the surface of the wind turbine rotor blades of wind turbines located in colder climates. These examples affect the aerodynamic properties of the rotor blades and may reduce the generated power of the wind turbines.

Different types of maintenance systems have been suggested in the past for maintaining the aerodynamic properties of rotor blades in wind turbine rotors. The suggestions include stationary systems built into the rotor blades and temporary maintenance systems for use on rotor blades during general service calls at the wind turbines.

Examples of stationary maintenance systems may include de-icing systems with channels inside the rotor blades for hot air circulating or electric wires taped on the rotor blade surfaces for electric heating. A stationary maintenance system often requires separate and complex structures and means.

An example of a temporary maintenance system is disclosed in international patent application no. 2013/032166 comprising a robot for servicing a wind turbine rotor blade by removing dirt or ice from the surface of the leading edge. The robot has a main body travelling along the leading edge of a rotor blade, legs extending from the main body toward both sides of the rotor blade to support the sides of the blade and a maintenance unit installed on the main body. The maintenance unit may include cleaning brushes or blow air on the outer surface as the robot travels along the rotor blade. The robot requires separate and complex legs and safety means in order to stay attached the rotor blade and perform wind turbine service regardless of the weather conditions.

Problems with the known maintenance systems for rotor blades on wind turbines are—at least—significant complexities in use.

It is an object of the invention to provide an improved method and system for performing maintenance on a rotor blade of a wind turbine rotor which seeks to reduce these problems.

SUMMARY OF THE INVENTION

The invention relates to a method for performing maintenance on a rotor blade of a wind turbine rotor including at least one rotor blade with an airfoil body formed from at least one blade shell element, the airfoil body having a suction-side surface and a pressure-side surface, a leading edge and a trailing edge, and a root end for mounting to a wind turbine hub and a distal tip end, said method comprising the steps of:

bringing the wind turbine rotor to a standstill,
introducing a mobile maintenance device into said rotor blade at the blade root end,
moving said mobile maintenance device to a location inside said rotor blade,
performing a maintenance operation at the location with said mobile maintenance device, and
removing said mobile maintenance device from said rotor blade at the blade root end.

Hereby, a method for performing maintenance at a location inside a rotor blade of a wind turbine rotor while being protected against exterior weather conditions is achieved.

The term "maintenance" should be understood as performing some form of maintenance inside a rotor blade with the mobile maintenance device or performing method steps with the device inside a rotor blade to determine whether some form of maintenance is required or not. The maintenance may include scheduled maintenance work on the rotor blade e.g. periodic check of the condition of the rotor blade, unscheduled maintenance work e.g. de-icing of the rotor blade, and preventive maintenance e.g. repair of minor damage inside the rotor blade i.e. any maintenance which has the objective of retaining or restoring the rotor blade in or to a state in which it can perform the required function.

According to an embodiment of the invention, said rotor is brought to a standstill with the leading edge of said rotor blade facing toward the ground. Hereby is ensured that the mobile maintenance device has a stable, at least partly horizontal inner surface of the rotor blade to move on and in the full length of the rotor blade without any risk for the device of sliding or falling of the rotor blade by loss of attachment. Further, the leading edge is the most exposed part of a rotor blade and hereby also the most relevant part to perform any maintenance process on with the mobile maintenance device.

According to an embodiment of the invention, a specific maintenance situation of said rotor blade is detected such as ice or rime on the rotor blade surface or damage by a lightning strike hitting the rotor blade. Hereby are achieved advantageous embodiments of the invention by detecting problematic situations of rotor blades.

According to an embodiment of the invention, a de-icing maintenance operation is performed with said mobile maintenance device by directing thermal energy and/or ultrasonic vibrations toward the inner surface of said rotor blade. The composite nature of a rotor blade wall in a wind turbine rotor may ensure an advantageous and efficient energy transfer to the innermost layer of ice or rime deposit on the rotor blade surface.

According to an embodiment of the invention, a detection maintenance operation is performed with detectors or sensors facing the inner surface of said rotor blade and included in said mobile maintenance device. Hereby is ensured that the detection of a value at the location is more precise than for example a general measurement of air temperature to detect the possibility of ice or rime depositing on the rotor blade.

According to an embodiment of the invention, said mobile maintenance device communicates with a main maintenance unit outside said rotor blade via wired or wireless connection means for transfer of electric energy and/or data communication. Hereby is ensured that the mobile maintenance device is powered, in contact with and monitored from outside the rotor blade and any difficulties inside the rotor blade may be assessed and handled from outside the rotor blade.

According to an embodiment of the invention, said mobile maintenance device is directionally guided in the rotor blade e.g. with one or more types of rails mounted on the inside of the rotor blade such as the two rails mounted on opposite side of a joint between two blade shell elements. Hereby is ensured that the mobile maintenance device does not deviate from a preferred route within the rotor blade and does not meet insurmountable obstacles.

According to an embodiment of the invention, said rotor is rotated to a new standstill position and the mobile maintenance device is introduced in another rotor blade.

In this way, all rotor blades on the wind turbine rotor may be maintained in a sequential manner, always having an at least partly horizontal interior blade surface to move on.

The invention also relates to a system for performing maintenance on a rotor blade of a wind turbine rotor including at least one rotor blade with an airfoil body formed from at least one blade shell element, the airfoil body having a suction-side surface and a pressure-side surface, a leading edge and a trailing edge, and a root end for mounting to a wind turbine hub and a distal tip end where said system comprises a mobile maintenance device including moving means and application means for moving inside said rotor blade and executing a method according to any of claims 1 to 7. Hereby, it is achieved a system for performing maintenance at a location inside a rotor blade of a wind turbine rotor while being protected against exterior weather conditions.

In an embodiment of the invention, said application means includes a heat energy provider such as a heat blower or dielectric heater directing thermal energy toward the inner surface of said rotor blade. Hereby is an advantageous embodiment of the invention achieved by providing the optimal means in the mobile maintenance device for performing de-icing maintenance on the rotor blade.

According to a further embodiment of the invention, said application means includes a rotor blade detector and/or sensor means such as digital camera and/or transmitter/receiver sensors such as ultrasonic or optical sensor systems. Hereby is it possible to obtain an enhanced and superior functionality of the mobile maintenance device in performing maintenance e.g. by monitoring and/or controlling the performance and movements of the device from outside the rotor blade.

According to an embodiment of the invention, said system comprises a main maintenance unit located outside said rotor blade and wired connection means and/or wireless connection means establishing a data and energy connection between said device and unit. Hereby, the mobile maintenance device may be kept small and lightweight, making it easier to manoeuvre inside the rotor blade.

In an embodiment of the invention, said wired connection means includes at least one data cable for transfer of data communication between the mobile maintenance device and the main maintenance unit, and/or at least one power cable for transfer of electric energy from the main maintenance unit or via the main maintenance unit to the mobile maintenance device, and/or at least one heat tube for transfer of heat energy from the main maintenance unit or via the main maintenance unit to the mobile maintenance device, and/or combinations hereof e.g. data and power cables as one connection means. Hereby is ensured that the connections for energy and data flow between the mobile maintenance device and the main maintenance unit will maintain constant and secure. The wired connection means also ensures that the mobile maintenance device may be easily retrieved from the rotor blade by dragging it out if a problem or malfunction occurs in the device.

According to an embodiment of the invention, said mobile maintenance device includes an on-board battery power pack for powering said device and application means e.g. electric motors for said moving means in the mobile maintenance device. Hereby it is ensured that the mobile maintenance device is easily operational for a long period of time when using wireless connection means between the mobile maintenance device and the main maintenance unit.

Preferably, said mobile maintenance device has storage outside said rotor blade in a non-operational station in the hub, nacelle or other wind turbine places in close proximity of the rotor. Hereby is ensured that the device is stored safely in a gentle environment when not in use while still being in close proximity of the rotor blades.

THE FIGURES

Embodiments of the invention will now be described, by way of example only, with reference to the accompanying drawings, which will be understood to be illustrative only, and are not provided to scale.

DETAILED DESCRIPTION

Figure 1:
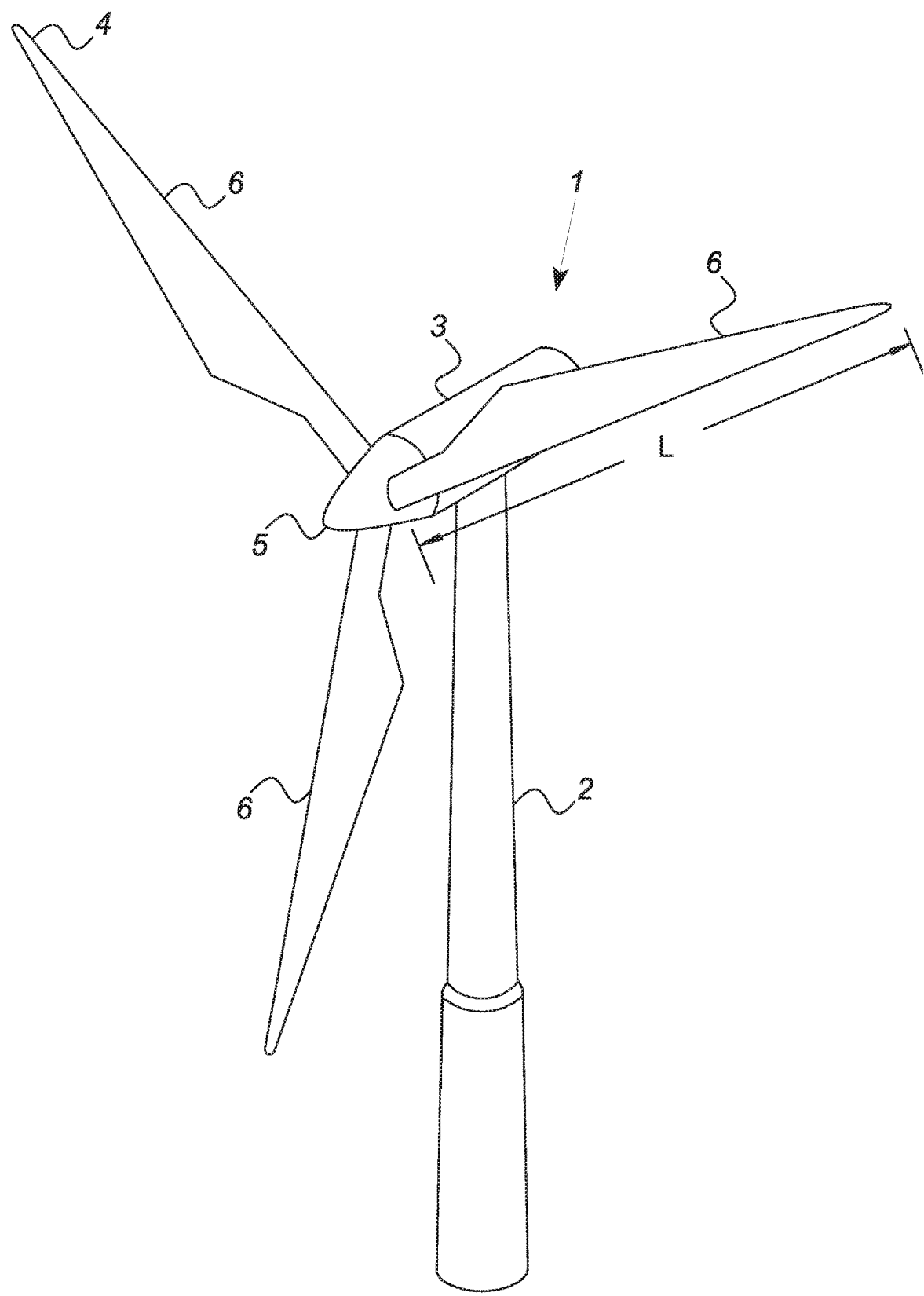
FIG. 1 is an isometric perspective view of a modern wind turbine with a rotor comprising three wind turbine rotor blades.

FIG. 1 illustrates an isometric perspective view of a modern wind turbine 1 that comprises a wind turbine tower 2 and a wind turbine nacelle 3 mounted on the tower 2. A rotor 4 of the wind turbine includes a wind turbine hub 5 and three wind turbine rotor blades 6 extending radially from the hub. Each of the rotor blades 6 have a length denoted L from root to tip.

Figure 2A:
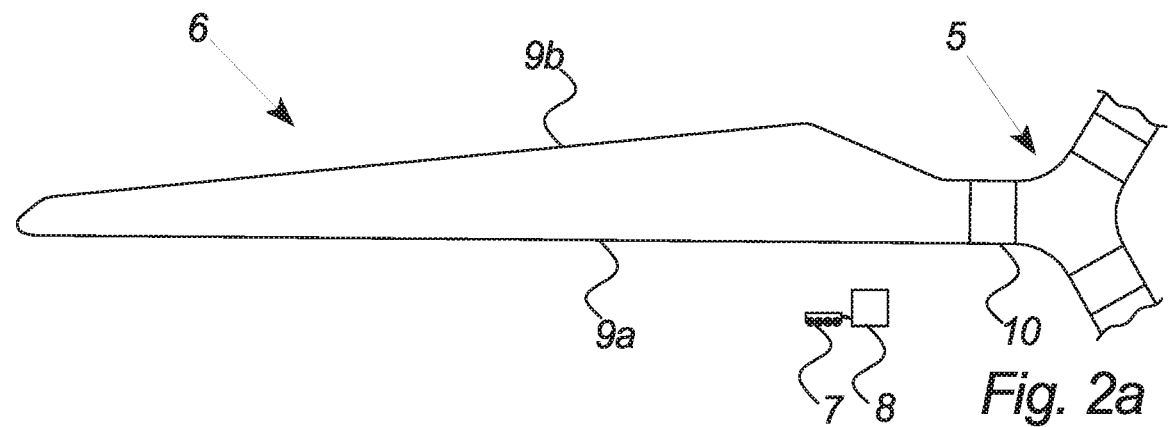
FIGS. 2a-2c are views illustrating different maintenance steps on a rotor blade of a wind turbine rotor according to an embodiment of the invention.
Figure 2B:
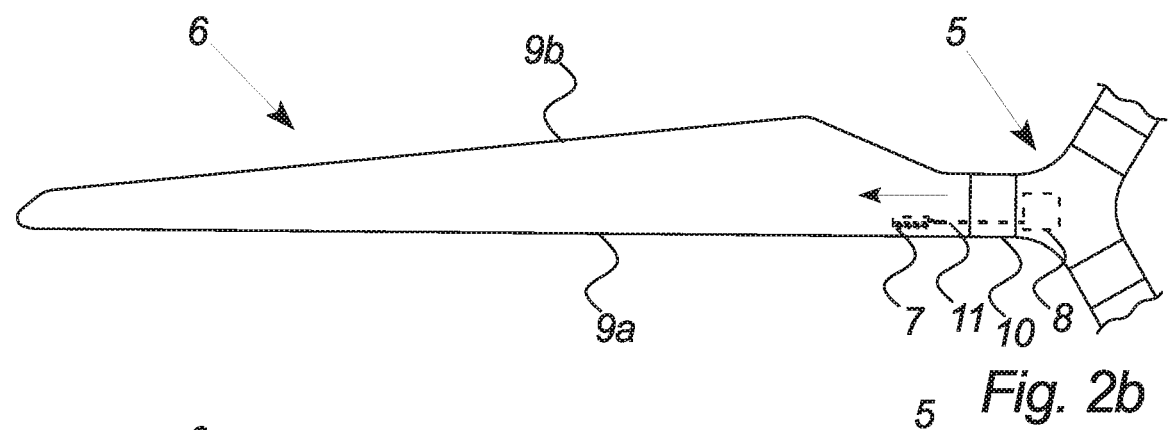
Figure 2C:
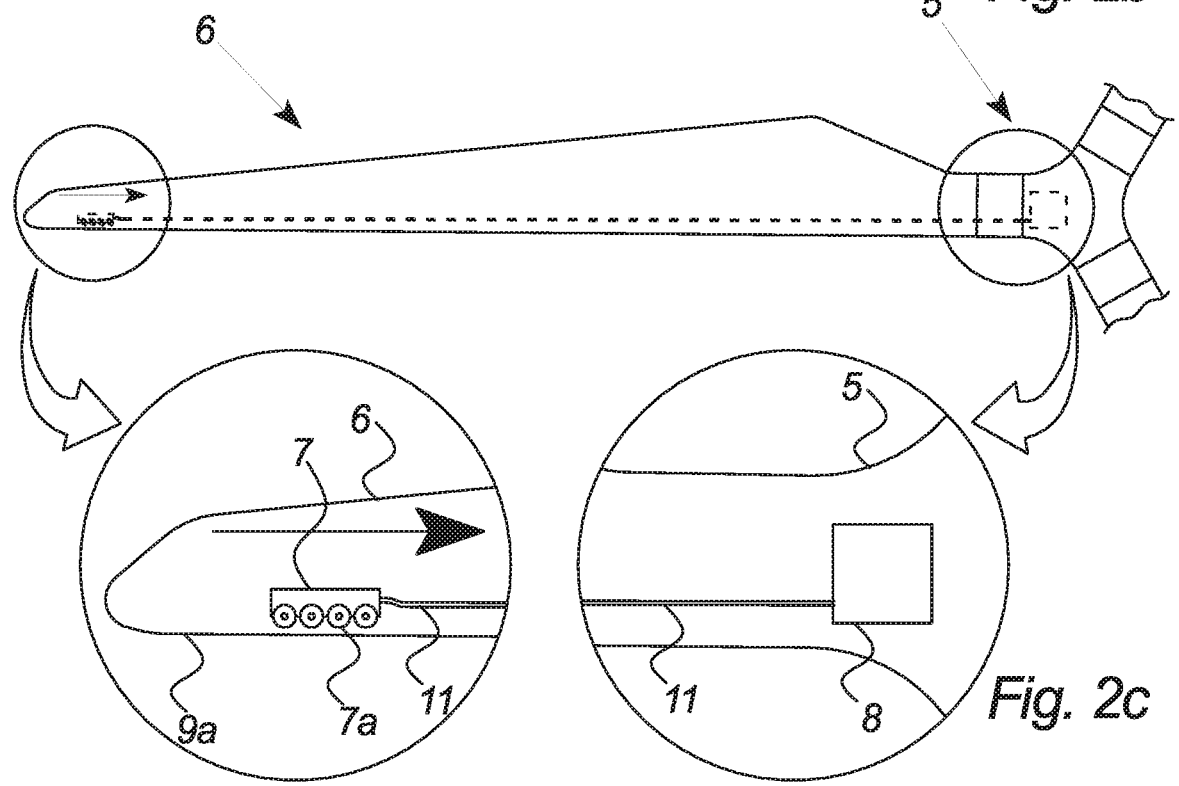

FIGS. 2a to 2c illustrate different succeeding maintenance steps on a rotor blade of a wind turbine rotor according to an embodiment of the invention.

FIG. 2a illustrates a first rotor blade 6 of a wind turbine rotor and the hub 5 as well as a root part of a second and third rotor blade in the rotor of a wind turbine. The remaining parts of the second and third rotor blades have been left out on the figure (as illustrated with the wavy lines).

The first rotor blade 6 has leading—and trailing edges 9a, 9b extending from the tip to the root part of the blade. The root part of the first and further rotor blades 6 include a pitch mechanism 10 whereby the structure of the rotor blades and rotor correspond with rotors on most modern wind turbines.

FIG. 2a also illustrates a system for performing maintenance inside a rotor blade of the rotor in a wind turbine. The system includes a mobile maintenance device 7 and a main maintenance unit 8 which may be brought to the site of a wind turbine by service people performing periodic maintenance work or handling a specific situation affecting the operation of the wind turbine.

FIG. 2b illustrates the introduction of the mobile maintenance device 7 into a first rotor blade 6 at the root end of the rotor blade after the rotor initially has been brought to a standstill.

The rotor is illustrated in the figure as stopped with the first rotor blade 6 in a substantially horizontal position and the leading edge 9a facing down toward the ground. The mobile maintenance device 7 is illustrated (in dotted lines) as moving horizontally inside the first rotor blade 6 after the device has been introduced into the blade via the hub 5, a blade entrance (not illustrated in the figure) and the surrounding pitch mechanism 10. Rotor blades in modern wind turbine rotors usually have an entrance door or hatch separating the interiors of the rotor blades from the interior of the hub.

The mobile maintenance device 7 is linked to the main maintenance unit 8 by a connection means 11 at the introduction of the device into the interior of the first rotor blade 6. The main maintenance unit 8 remains located outside the interior of the rotor blades 6 e.g. located in the hub, nacelle or other wind turbine places in close proximity of the rotor blades 6.

The connection means 11 may include:
- data cables for transfer of data communication between the mobile maintenance device 7 and the main maintenance unit 8,
- power cables for transfer of electric energy from the main maintenance unit 8 or via the main maintenance unit 8 to the mobile maintenance device 7,
- heat tubes for transfer of heat energy from the main maintenance unit 8 or via the main maintenance unit 8 to the mobile maintenance device 7, and
- combinations of the above mentioned connections such as data and power cables in one connection.

Consequently, the connection means 11 provide a connection for transfer of data and/or energy between the mobile maintenance device 7 and main maintenance unit 8.

Further examples of connections means between the mobile maintenance device 7 and a main maintenance unit 8 will be explained and illustrated in relation to FIGS. 3 to 7b.

Figure 3:
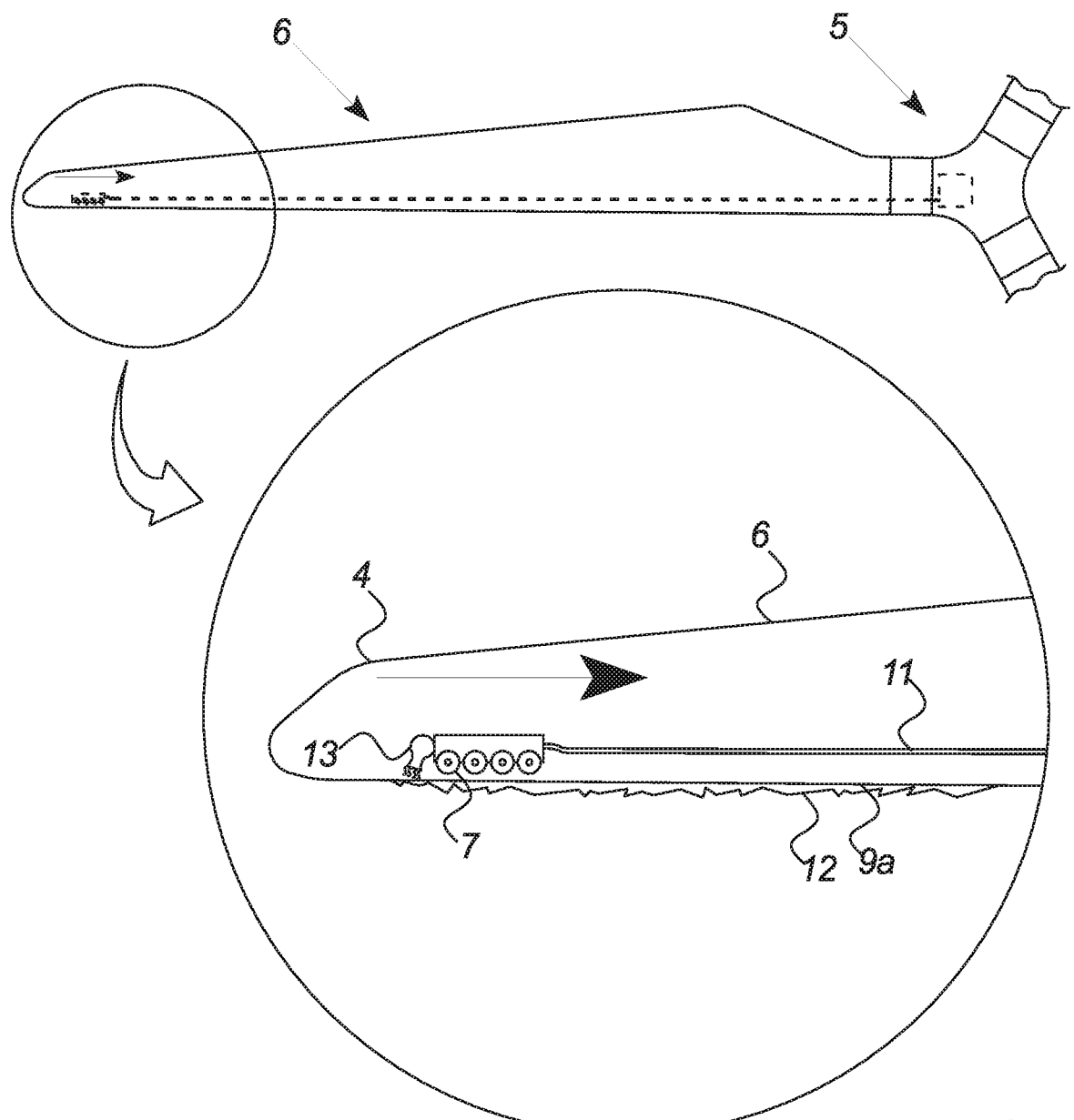
FIG. 3 is a view of an embodiment of the invention involving de-icing in a rotor blade of a wind turbine rotor using a mobile maintenance device.
Figure 4:
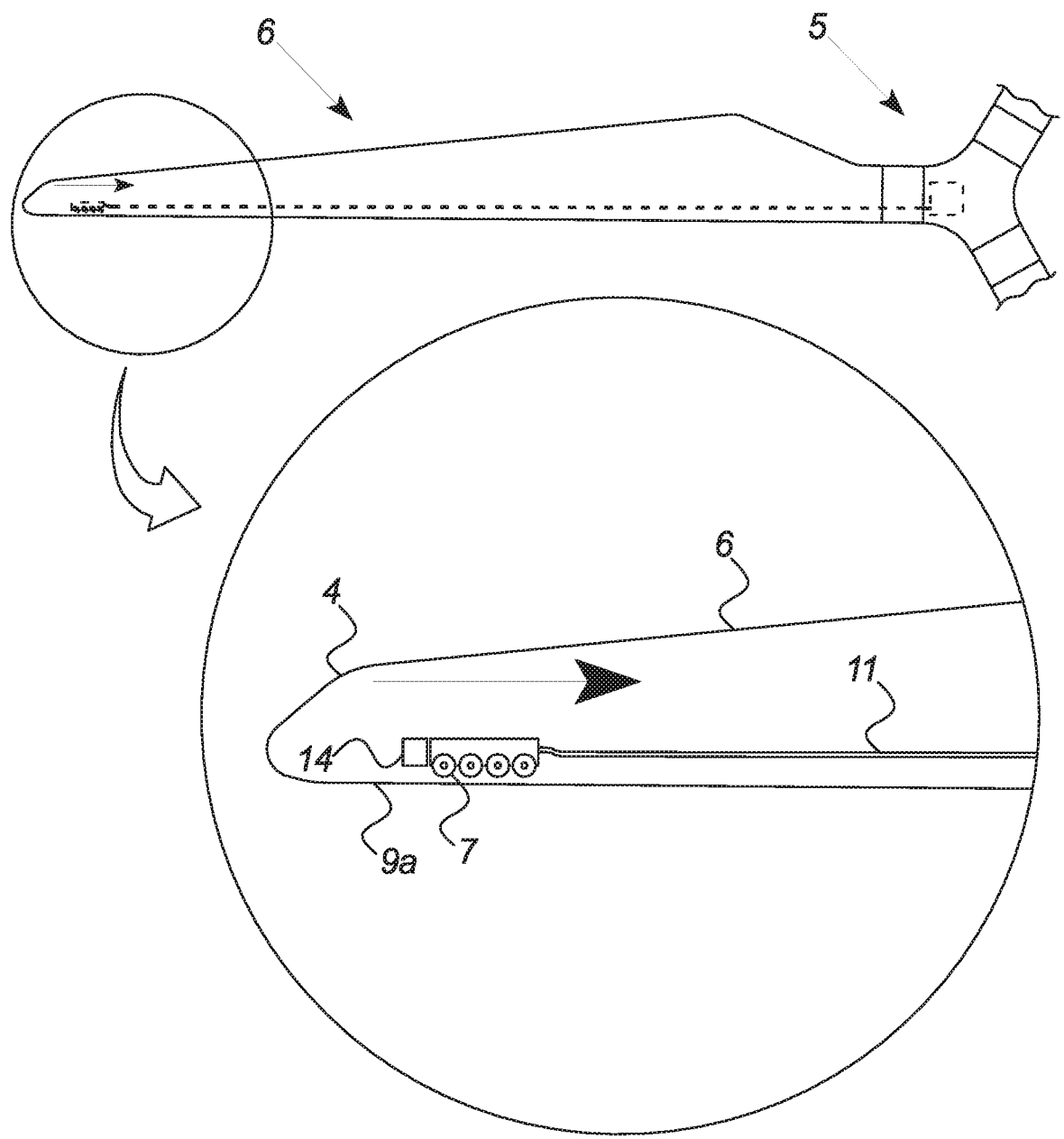
FIG. 4 is a view of an embodiment of the invention involving detection in a rotor blade of a wind turbine rotor using a mobile maintenance device.
Figure 5:
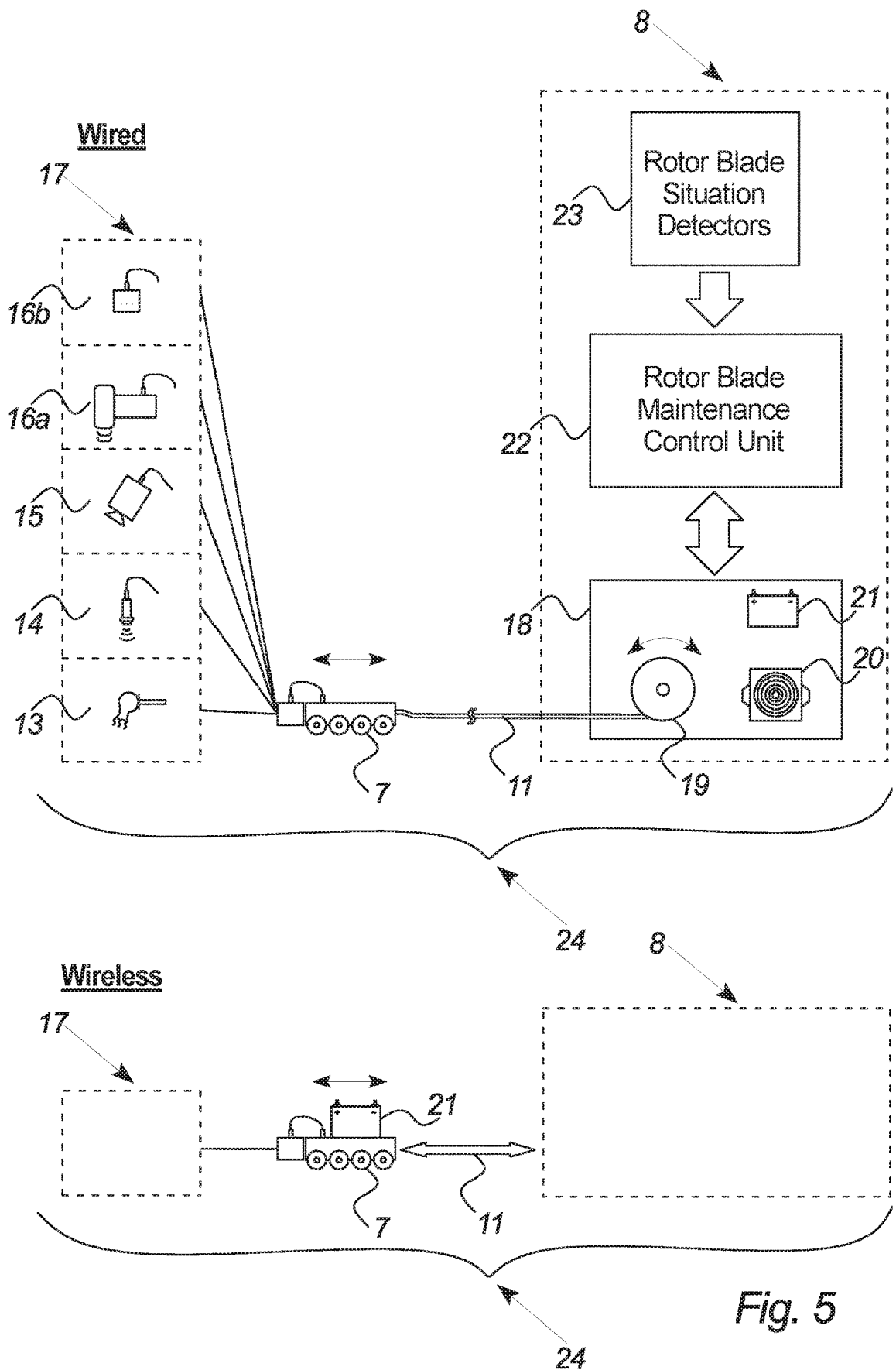
FIG. 5 is a view of an embodiment of a system for performing maintenance in a rotor blade of a wind turbine rotor according to embodiments of the invention.

Different uses for the connection between the mobile maintenance device 7 and the main maintenance unit 8 will especially be further detailed in relation to FIGS. 3 to 5.

The mobile maintenance device 7 is moving in direction toward the blade tip (as illustrated by the arrow) in order to reach a location for performing maintenance inside the first rotor blade 6.

FIG. 2c illustrates the mobile maintenance device 7 having reached at an outmost location for performing maintenance inside the first rotor blade 6 and are moving back in a direction toward the hub (as illustrated by the arrow).

A left figure enlargement of the tip area in the rotor blade illustrates the mobile maintenance device 7 as a small vehicle with a number of rubber wheels 7a allowing it to move inside the confined space of a rotor blade regardless of internal boundaries and barriers. The vehicle may however also be equipped with other types of propulsion such as continuous tracks if necessary.

The mobile maintenance device 7 may be moved by one or more electric motors acting on the wheels or tracks when moving forward inside the rotor blade. The mobile maintenance device 7 may also use the electric motors when moving back toward the main maintenance unit 8 located in the hub or the main maintenance unit 8 may include means for pulling the device 7 back.

The mobile maintenance device 7 is ready for carrying and acting as a platform for different means used in performing maintenance inside a rotor blade of the rotor on the wind turbine. The mobile maintenance device 7 may also act as a coupling joint between the different means and the connection means 11 to the main maintenance unit 8.

The different means of the mobile maintenance device 7 may be manipulated in three or more axes as a robot or robotic mechanism, if necessary, in order to perform maintenance processes inside the rotor blade.

FIG. 3 illustrates a first embodiment of the invention involving a maintenance process of de-icing a horizontal wind turbine rotor blade during standstill of the rotor.

Ice and rime may form on the surface of the wind turbine rotor blades in a cold climate. The buildup of ice during operation of a wind turbine may concentrate along the leading edge of the rotor blades and especially at the tip area. Ice on the rotor blades affect the aerodynamic properties of the rotor blades and may reduce the generated power of the wind turbine.

The buildup of ice on the wind turbine rotor may initially be identified by ice sensors located on the outside of the nacelle or tower. The ice sensors may for example be temperature sensors detecting a weather situation with danger of ice buildup or digital cameras identifying actual ice or rime on the rotor blades.

The mobile maintenance device 7 carries in this embodiment a heat energy provider 13. The heat energy provider 13 delivers thermal energy directed at the inside surface of the rotor blade along the leading edge 9a wherein ice or rime 12 has formed on the corresponding outside surface of the leading edge 9a. The leading edge 9a is located at standstill as facing down toward the ground. The provided thermal energy at the inside surface melts the innermost ice layer whereby large pieces of ice may break free from the rotor blade and fall to the ground.

The heat energy provider 13 may comprise an electric heater and blower wherein electric energy is transferred from a power supply in the main maintenance unit 8 via a power cable in the connection means 11 and the mobile maintenance device 7 to the electric heater and blower. The blower may direct hot air from the electric heater toward the inner surface of the rotor blade at the leading edge 9a. The heat energy provider 13 may also comprise a dielectric heater radiating microwaves toward the inner surface of the rotor blade at the leading edge 9a.

The heat energy provider 13 can alternatively comprise a tube fitting at one end for establishing a coupling to a heat tube of the connection means 11 that transports a flow of hot air from a heat energy supply in the main maintenance unit 8. The hot air of the connection means 11 may be transported via the mobile maintenance device 7 to a directional mouthpiece of the heat energy provider 13 which directs hot air toward the inner surface of the rotor blade at the leading edge 9a.

The heat energy provider 13 and mobile maintenance device 7 are moved back along the inner surface of the rotor blade at the leading edge 9a by the internal electric motors of the device or by pulling the device 7 back by retracting the connection means 11 at the main maintenance unit 8. The speed of the heat energy provider 13 and mobile maintenance device 7 can be a constant value or for example defined by a temperature sensor in the device 7 measuring the resulting temperature at the inner surface from the provided heat energy. The sensor data is transferred via a data cable in the connection means 11 to the main maintenance unit 8 as part of the de-icing maintenance process and control.

The heat energy provider 13 and mobile maintenance device 7 are moved back along the inner surface of the rotor blade at the leading edge 9a until the rotor blade area of ice or rime has been processed. The heat energy provider 13 and mobile maintenance device 7 are hereafter removed from the first rotor blade via the blade entrance door or hatch. The rotor of the wind turbine is preferably rotated to provide a second rotor blade in a substantially horizontal position before introducing the heat energy provider 13 and mobile maintenance device 7 in the interior of the second rotor blade and subsequently the third rotor blade in a three-bladed rotor to perform the second and third de-icing maintenance processes.

FIG. 4 illustrates another embodiment of the invention involving a maintenance process of detection in a wind turbine rotor blade.

Rotor blades may be exposed to different weather situations which may require subsequent maintenance process such as a lightning strike hitting a rotor blade. A hit of lightning strike may initially be identified by lightning detectors such as cameras located on the outside of the nacelle or tower or sensors located in the rotor blades e.g. lightning current sensors.

A lightning strike often hits along the leading edge in the rotor blade tip area and will be intercepted by one or more blade receptors in the lightning protection system of the wind turbine rotor. The significant energy of the lightning strike may however suggest that the lightning impact area of the rotor blade is investigated as part of a maintenance process. The investigation may include visible detection of the inner surface of the rotor blade or detection of imperfections underneath the inner surface of the rotor blade using detector or sensor means 14 such as a digital camera or transmitter/receiver sensors e.g. ultrasonic or optical sensor systems.

FIG. 5 illustrates a wired and wireless embodiment of a system 24 for performing maintenance on a rotor blade of a wind turbine rotor.

The maintenance process with the mobile maintenance device 7 may be performed and controlled by a service person present at the wind turbine e.g. located at the main maintenance unit 8 in the hub 5. The maintenance process may also be remote controlled by a service person present in a service centre for the wind turbine or by automatic control performed without interaction of a service person e.g. initiating rotor standstill and deploying the mobile maintenance device 7 in response to, for example, low temperature measurements. The latter possibilities require a permanent presence of a mobile maintenance device 7 and main maintenance unit 8 in the wind turbine e.g. stored in the hub 5 when not in use.

The system 24 illustrated in the figure is adaptable for different maintenance processes and uses such as the above mentioned system for de-icing and system for detection inside a rotor blade.

The system 24 is provided with a number of different application means 17 for the mobile maintenance device 7. The application means 17 may include the heat provider 13 as part of a system for de-icing and/or the detector or sensor means 14 as part of a system for detection inside a rotor blade. The application means 17 may also include a digital camera 15 or similar optical means for navigating inside the rotor blade and/or inspecting the inner surface of the rotor blade. Inspection of the inner surface may be used in detecting a fixed reference mark inside the rotor blade as a navigational starting point for the mobile maintenance device 7 in moving to a location for performing a maintenance process. The mobile maintenance device 7 may also be provided with further means e.g. as tools participating in a maintenance process or assistance in performing the maintenance process. The further means may for example be an ultrasound unit 16a for removal of ice or rime on the outer surface of the rotor blade with use of ultrasonic vibrations transmitted through a shell wall of the rotor blade e.g. at the leading edge of the rotor blade. Other further means 16b may for example be surveillance sensors used during the maintenance process such as temperature sensors surveying a de-icing process. Further means 16b may also be tools performing preventive maintenance actions inside the rotor blade as e.g. repairing minor damage to the inner blade surface or equipment located inside the rotor blade with use of a small robot arm on the device 7.

The application means 17 for the mobile maintenance device 7 such as the heat provider 13 may be separate units attached to the device 7 or integrated parts of the device 7. The mobile maintenance device 7 with attached or integrated application means may comprise one or more application means 17 at the same time such as a digital camera 15 in combination with a heat provider 13 to facilitate navigation of the mobile maintenance device 7 while de-icing inside a rotor blade.

The main maintenance unit 8 in the system 24 has in a first embodiment a wired connection means 11 to the mobile maintenance device 7. Different types and applications of the wired connection means 11 has been detailed above in relation to FIG. 2b such as:

data cables for transfer of data communication between the mobile maintenance device 7 and the main maintenance unit 8, power cables for transfer of electric energy from the main maintenance unit 8 or via the main maintenance unit 8 to the mobile maintenance device 7, heat tubes for transfer of heat energy from the main maintenance unit 8 or via the main maintenance unit 8 to the mobile maintenance device 7, and combinations of the above mentioned connections such as data and power cables in one connection. An energy supply apparatus 18 of the main maintenance unit 8 may include a reel drum 19 for reeling the wired connection means 11 in and out in accordance with the location and movement of the mobile maintenance device 7 inside the rotor blade.

The apparatus 18 may also include different energy suppliers for the mobile maintenance device 7 via the connection means 11. A heat energy supply 20 is a first example which can provide a flow of heat to the heat energy provider 13 on the mobile maintenance device 7 via heat tubes in the connection means 11. Another example is an electric energy supply 21 such as electric batteries or generator which can provide electric energy to the mobile maintenance device 7 via power cables in the connection means 11.

The system 24 has in a second embodiment wireless connection means 11 between the main maintenance unit 8 and the mobile maintenance device 7 instead of the wired connection means 11 of the first embodiment. The mobile maintenance device 7 is in this embodiment powered by an electric energy supply 21 installed on the device 7 as an on-board battery power pack. The battery power pack energy supplies drive means of the mobile maintenance device 7 e.g. one or more electric motors acting on the wheels or tracks of the device. The battery power pack also energy supplies the application means 17 used in the mobile maintenance device 7. The wireless connection means 11 of this embodiment is used for data communication between the unit 8 and the device 7 e.g. data communication via a wireless Bluetooth data connection or similar types of wireless connection means for exchanging data over short distances.

The on-board battery power pack may be recharged in a storage location when the mobile maintenance device 7 has left the rotor blade and is in non-operational situation. The storage and recharge location may be a non-operational station for the mobile maintenance device 7 located in close proximity of the wind turbine rotor 5 such as in the hub, nacelle or other wind turbine places in close proximity of the rotor. The storage and recharge location for the mobile maintenance device 7 is preferably at the same location as the location of the main maintenance unit 8.

The rotor blade situation detectors 23 may for example be ice sensors of the de-icing process as explained above in relation to FIG. 3 or lightning detectors of the detector process as explained above in relation to FIG. 4.

The rotor blade maintenance control unit 22 will receive data input from any rotor blade situation detectors 23 as well as data communication from the mobile maintenance device 7 via data cables or wireless connections in the wired or wireless connection means 11. The control unit 22 processes the received data to provide the main maintenance unit 8 and mobile maintenance device 7 with necessary control data such as the location inside the rotor blade where the mobile maintenance device 7 is required to perform a maintenance process. A display receiving data from the control unit 22 may provide a nearby service person with images or information from the mobile maintenance device 7 performing maintenance inside the rotor blade e.g. for enabling the person to operate and control the device. The control unit 22 may also have a communication link to a remote service centre for the wind turbine to facilitate operation of the mobile maintenance device 7 by a service person present in the centre or for transferring maintenance data to a storage e.g. if the system 24 operates independently of service personnel. Further, the control unit 22 may have different data information stored regarding the interior of the rotor blade such as a digital map with information about inner blade obstacles and routes for the mobile maintenance device 7 to automatically avoid or overcome the obstacles e.g. in a communication with a camera on the device.

Figure 6:
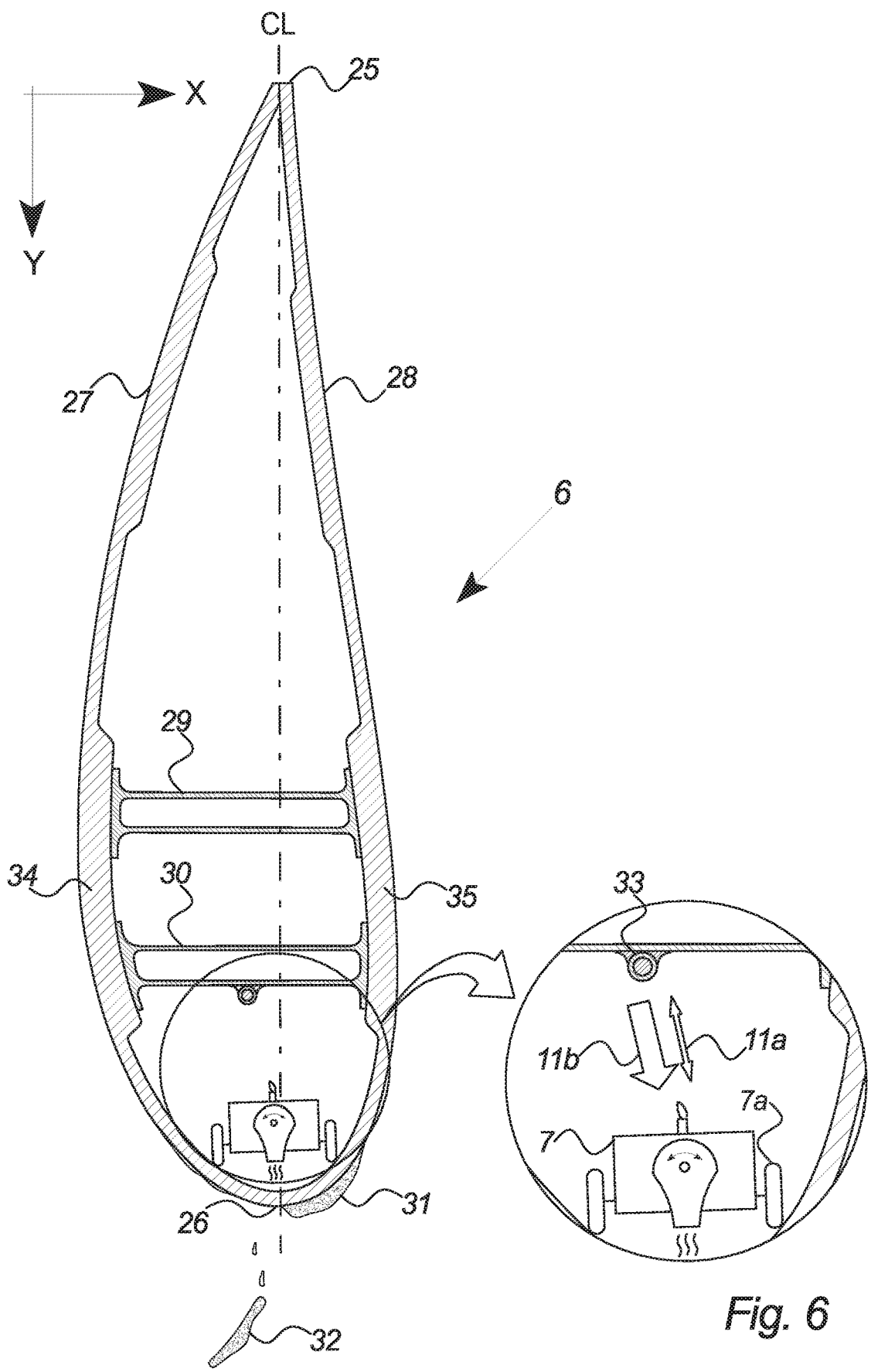
FIG. 6 is a view of an embodiment of a system for performing maintenance in a rotor blade of a wind turbine rotor according to the invention with wireless connection means for transfer of data and/or energy.

FIG. 6 is a cross-sectional view through a rotor blade 6 with an alternative embodiment of a system for performing maintenance in a rotor blade of a wind turbine rotor according to the invention.

The mobile maintenance device 7 of the system is illustrated in the figure as moving on the inner blade surface at the joint 26 of the leading edge between the suction-side surface 27 and the pressure-side surface 28 of the rotor blade 6. The joint 26 of the leading edge and the opposite joint 25 of the two blade shell elements 34, 35 at the trailing edge of the rotor blade 6 define a chord line CL for the rotor blade. The rotor blade 6 is strengthened internally by two shear webs 29, 30 connecting the inner surfaces of the two blade shell elements 34, 35.

The figure also illustrates a maintenance process of de-icing the rotor blade 6 of a wind turbine rotor during a rotor standstill with a mobile maintenance device moving inside the rotor blade and radiating heat to the inner surface of the rotor blade. The radiated heat is conducted through one of the composite shell elements 34, 35 of the rotor blade 6 and removes ice or rime 31 on the outer blade surface by first melting the innermost layer of ice or rime. The ice or rime will hereby lose contact with the blade surface and fall to the ground e.g. as the pieces of ice 32 illustrated in the figure.

The chord line CL of the rotor blade 6 is preferably substantially vertical with the leading edge 26 facing toward the ground at standstill. The surface at the leading edge of a rotor blade 6 is more prone to cumulate ice or rime than the rest of the blade surface during operation of the wind turbine in freezing temperatures. Pieces of ice 32 will more easily loose contact to the blade surface when the leading edge of the rotor blade is facing toward the ground and will fall from the rotor blade without hitting blade surface during the fall.

The enlargement of FIG. 6 especially illustrates a wireless connection means 11a, 11b for transfer of data and/or energy between a mobile maintenance device 7 and a main maintenance unit (not illustrated in the figure). The wireless data and energy connections are illustrated in the figure enlargement as using a lightning down-conductor 33 of the lightning protection system for the rotor blade. The conductor runs through the rotor blade from blade tip to blade root and connects lightning receptors in the rotor blade surface with an electric ground or earth e.g. via cables in the hub, nacelle and tower. The cables of the lightning protection system may be briefly disconnected during the maintenance process from the electric ground e.g. in the hub and connected to an energy source in the main maintenance unit 8. The mobile maintenance device 7 will hereafter continuously receive electric energy from the energy source by establishing an inductive coupling with the down-conductor while moving through the rotor blade in close proximity of the down-conductor 33. The mobile maintenance device 7 may also comprise an on-board battery storage which is recharged with electric energy from the down-conductor in a number of predefined charge locations comprising the necessary means for inductively charging the battery storage of the device.

Figure 7A:
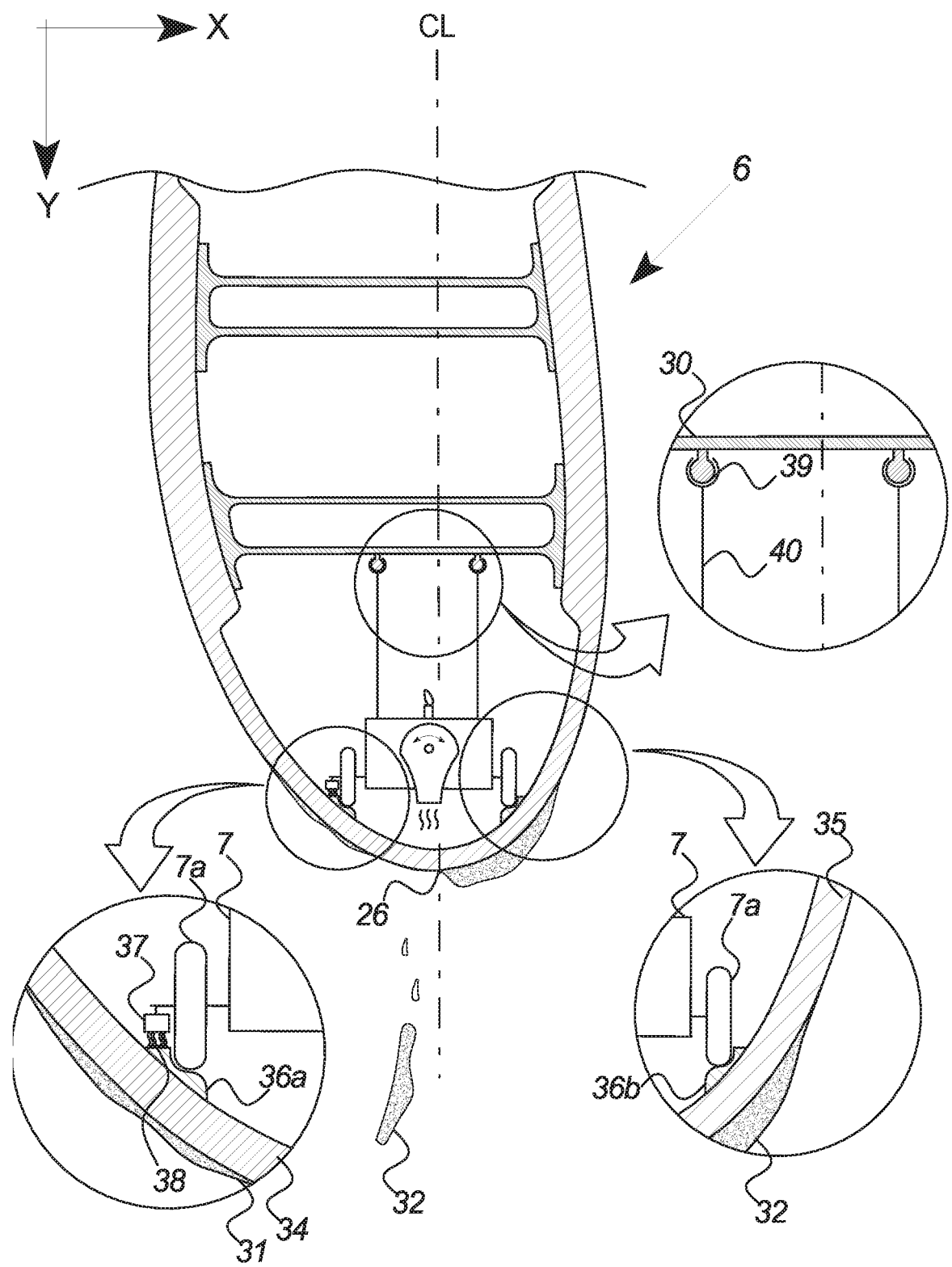
FIG. 7a is a view of different embodiments of the system with wired connection means and guidance means for a mobile maintenance device inside a rotor blade as especially illustrated in the three enlargements.

FIG. 7a is a cross-sectional view of a rotor blade 6 with embodiments of the system according to the invention. The rotor blade is at a rotor standstill with the leading edge of the blade facing toward the ground. The embodiments of the system include wired connection means and guidance means for a mobile maintenance device 7 inside the rotor blade 6 as especially illustrated in the three enlargements of the figure.

The enlargements in the lower corners illustrate wheels 7a of the mobile maintenance device 7 being directionally guided inside the rotor blade by two rails 36*a*, 36*b*. The rails have been mounted on the inside of the rotor blade 6 e.g. on opposite side of the joint 26 between the two blade shell elements 34, 35 at the leading edge. The rails may for example have been made in a composite material and mounted as part of the rotor blade manufacturing.

The upper surface of the rail 36*a* illustrated in the lower left enlargement also comprises a set of conductor bars 38 as part of wired connection means for the transfer of electric energy to the mobile maintenance device 7 from the main maintenance unit (not illustrated in the figure). The energy transfer is performed by a sliding transfer unit 37 of the mobile maintenance device 7 having brushes sliding on the conductor bars 38 in establishing electric contact between the bars and drive means in the device 7 for driving the wheels 7*a*. The wired connection means may also include conductor bars for transferring data communication between the mobile maintenance device 7 and the main maintenance unit but these bars have not been illustrated in the figure and the data communication may also be performed via wireless connection means as explained above.

The upper enlargement of the figure illustrates the mobile maintenance device 7 being directionally guided inside the rotor blade by use of suspension rails 39 on the second shear web 30 and wires 40 suspending the mobile maintenance device 7 from the web. The wires 40 are connected to the suspension rails 39 in a manner which allow the wires 40 and the suspended device 7 to slide inside the rotor blade along the rails e.g. by the wires having gripping means that loosely grips the rails. The device 7 moves on the inner surface of the rotor blade 6 with the wheels 7*a* while being suspended from the web 30 and is directionally guided by the wires and suspension rails. The wires and suspension rails 39, 40 may also be used as wired connection means for energy transfer and/or data communication between the mobile maintenance device 7 and the main maintenance unit.

Figure 7B:
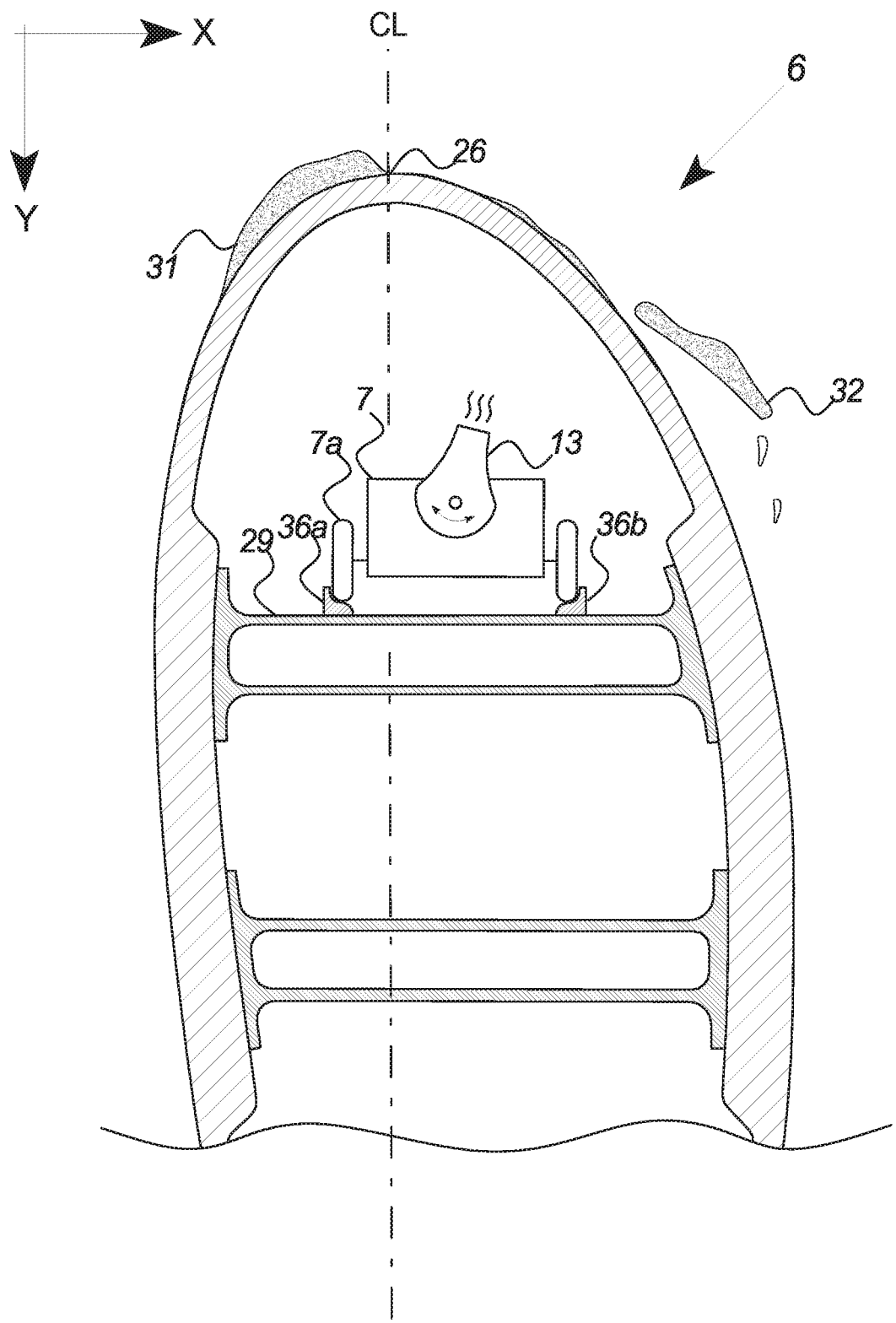
FIG. 7b is a view of an alternative embodiment of the system according to the invention.

FIG. 7*b* is a cross-sectional view of a rotor blade 6 with an alternative embodiment of the system according to the invention e.g. as illustrated in FIG. 7*a*.

The figure illustrates the rotor blade 6 with the leading edge 26 facing up and the trailing edge facing the ground (not illustrated in the figure) with the wind turbine rotor at a standstill. The mobile maintenance device 7 is moving on the surface of the first shear web 29 while aiming the heat energy provider 13 such as a heat blower toward the inner blade surface at the joint of the leading edge 26 in order to remove ice or rime on the outer blade surface.

The shear web 29 is also illustrated with two rails 36*a*, 36*b* mounted on the surface for directional guidance of the mobile maintenance device 7 inside the rotor blade. The rails may for example have been made in a composite material and mounted as part of the rotor blade manufacturing.

Similar solutions as the rails illustrated in FIGS. 7*a* and 7*b* for guidance of the mobile maintenance device may also be mounted on the inner surface of one shell element in the rotor blade. Different maintenance processes may be performed on the rotor blade by the mobile maintenance device after the rotor blade is rotated to angle which allows the device to move on the inner surface of the one shell element e.g. with the chord line CL being substantial horizontal.

It should be emphasised that the relationship in size between the rotor blade and the mobile maintenance device in FIGS. 2*a* to 7*b* do not necessarily correspond with real sizes of the rotor blade and device.

Figure 8:
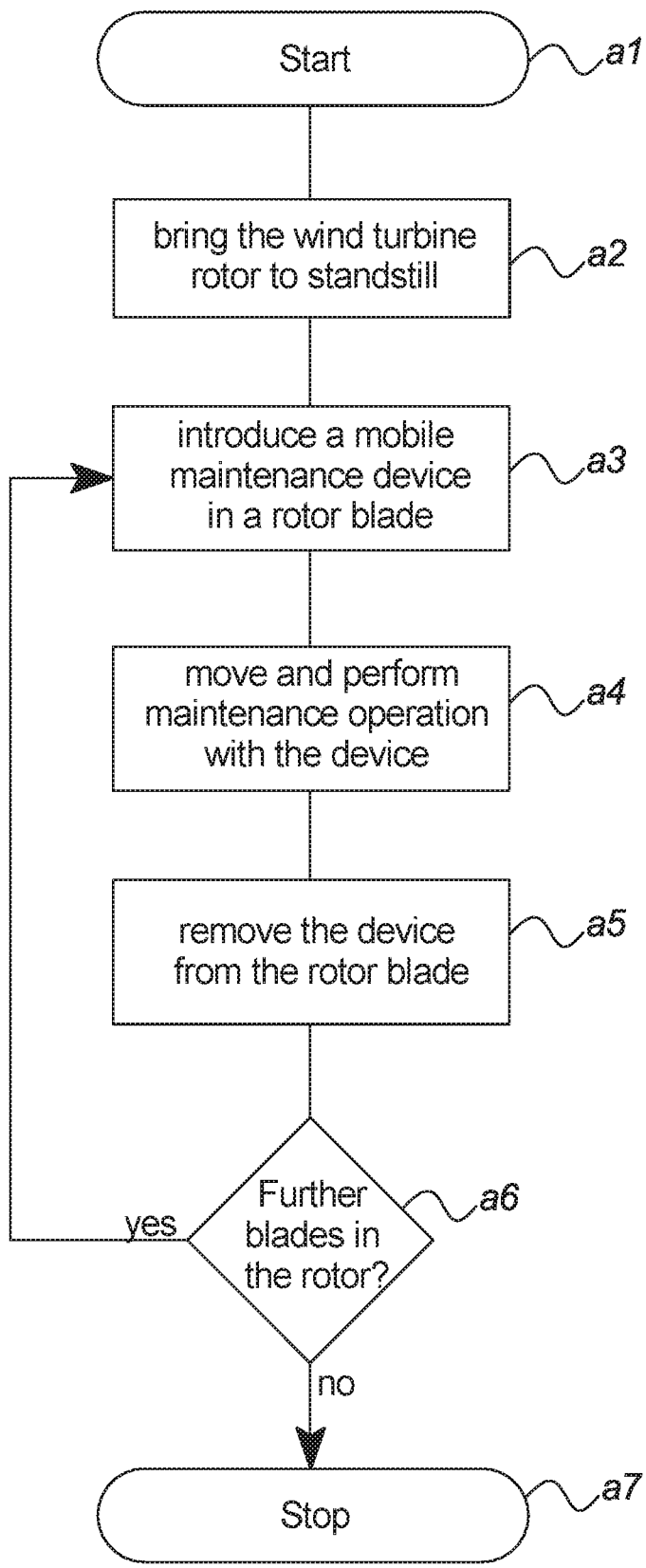
FIG. 8 is a flow diagram of a method for performing maintenance on a rotor blade of a wind turbine rotor according to embodiments of the invention.

FIG. 8 illustrates a flow diagram of a method for performing maintenance on a rotor blade of a wind turbine rotor according to the invention.

The method for performing maintenance on a rotor blade of a wind turbine rotor including at least one rotor blade comprises:

Steps a1-a2: Bringing the wind turbine rotor to a standstill as an initial action.

Step a3: Introducing a mobile maintenance device into said rotor blade at the blade root.

Step a4: Moving said mobile maintenance device inside said rotor blade to a location and performing a maintenance operation at the location with said mobile maintenance device.

Step a5: Removing said mobile maintenance device from said rotor blade.

The method steps a1-a5 may be repeated for any further rotor blades on the rotor if these rotor blades also require maintenance.

In the above description, various embodiments of the invention have been described with reference to the drawings, but it is apparent for a person skilled within the art that the invention can be carried out in an infinite number of ways, using e.g. the examples disclosed in the description in various combinations, and within a wide range of variations within the scope of the appended claims.

LIST OF REFERENCE NUMBERS

1. Wind turbine
 2. Wind turbine tower
 3. Wind turbine nacelle
 4. Wind turbine rotor
 5. Wind turbine hub
 6. Rotor blade with an air foil body on the wind turbine rotor
 7. Mobile maintenance device
 7*a*. Moving means such as wheels or continuous tracks
 8. Main maintenance unit
 9*a*. Leading edge of a rotor blade
 9*b*. Trailing edge of a rotor blade
 10. Pitch mechanism for a rotor blade
 11. Wired or wireless connection means for transfer of data and/or energy between the mobile maintenance device and main maintenance unit
 11*a*. Wireless connection means for transfer of data between the mobile maintenance device and the main maintenance unit
 11*b*. Wireless connection means for transfer of energy to the mobile maintenance device from the main maintenance unit
 12. Ice or rime on the leading edge of a rotor blade
 13. Heat energy provider such as a heat blower or dielectric heater for a mobile maintenance device
 14. Rotor blade detector or sensor means
 15. Rotor blade orientation means such as a camera
 16*a*. Ultrasound unit for a mobile maintenance device in removal of ice or rime with ultrasonic vibrations
 16*b*. Further means for a mobile maintenance device
 17. Application means for a mobile maintenance device
 18. Energy supply apparatus
 19. Reel drum for the connection means
 20. Heat energy supply for the mobile maintenance device
 21. Electric energy supply for the mobile maintenance device
 22. Rotor Blade Maintenance Control Unit
 23. Rotor Blade Situation Detectors 24. System for performing maintenance in a rotor blade of a wind turbine rotor
25. Joint of the blade shell elements at the trailing edge of the rotor blade
26. Joint of the blade shell elements at the leading edge of the rotor blade
27. Suction-side surface of the rotor blade
28. Pressure-side surface of the rotor blade
29. First shear web of a strengthening structure in the rotor blade
30. Second shear web of a strengthening structure in the rotor blade
31. Layer of ice or rime on the blade surface such as the surface at the leading edge
32. Falling pieces of ice or drops of melting ice
33. Lightning down-conductor in the lightning protection system
34. First blade shell element of the rotor blade
35. Second blade shell element of the rotor blade
36a, 36b. Rails for guiding the mobile maintenance device through the rotor blade
37. Sliding transfer unit of the mobile maintenance device for electric energy supply
38. Conductor bars for electric contact with the sliding transfer unit
39. Suspension rails on the second shear web
40. Wires for suspending the mobile maintenance device
a1-a7. Flow diagram
CL. Chord line of the wind turbine blade from leading edge to trailing edge
L. Length of a rotor blade in a wind turbine

The invention claimed is:

1. A method for performing maintenance on a rotor blade of a wind turbine rotor including at least one rotor blade with an airfoil body formed from at least one blade shell element, the airfoil body having a suction-side surface and a pressure-side surface, a leading edge and a trailing edge, and a root end for mounting to a wind turbine hub and a distal tip end, said method comprising the steps of:
bringing the wind turbine rotor to a standstill;
introducing a mobile maintenance device into said rotor blade at the blade root end;
moving said mobile maintenance device to a location inside said rotor blade;
performing a maintenance operation at the location inside the rotor blade with said mobile maintenance device; and
removing said mobile maintenance device from said rotor blade at the blade root end.

2. The method according to claim 1, where said rotor is brought to a standstill with the leading edge of said rotor blade facing toward the ground.

3. The method according to claim 1, where a specific maintenance situation of said rotor blade is detected such as ice or rime on the rotor blade surface or damage by a lightning strike hitting the rotor blade.

4. The method according to claim 1, where a de-icing maintenance operation is performed with said mobile maintenance device by directing thermal energy and/or ultrasonic vibrations toward the inner surface of said rotor blade.

5. The method according to claim 1, where a detection maintenance operation is performed with detectors or sensors facing the inner surface of said rotor blade and included in said mobile maintenance device.

6. The method according to claim 1, where said mobile maintenance device communicates with a main maintenance unit outside said rotor blade via wired or wireless connection means for transfer of electric energy and/or data communication.

7. The method according to claim 1, where said mobile maintenance device is directionally guided in the rotor blade.

8. The method according to claim 7, wherein said mobile maintenance device is directionally guided in the rotor blade with one or more types of rails mounted inside the rotor blade.

9. The method according to claim 8, wherein the one or more types of rails comprise two rails mounted on opposite sides of a joint between two blade shell elements.

10. The method according to claim 1, where said rotor is rotated to a new standstill position and the mobile maintenance device is introduced in another rotor blade.

11. A system (24) for performing maintenance on a rotor blade of a wind turbine rotor including at least one rotor blade (6) with an airfoil body formed from at least one blade shell element, the airfoil body having a suction-side surface (27) and a pressure-side surface (28), a leading edge (26) and a trailing edge (25), and a root end for mounting to a wind turbine hub and a distal tip end, wherein said system comprises a mobile maintenance device (7) including moving means (7a) and application means (17) for moving inside said rotor blade (6), wherein following bringing the wind turbine rotor to a standstill, the mobile maintenance device (7) is configured to:
be introduced into said rotor blade at the blade root end thereof;
move to a location inside said rotor blade;
perform a maintenance operation at the location inside said rotor blade; and
be removed from said rotor blade at the blade root end thereof.

12. The system (24) according to claim 11, wherein said application means (17) includes a heat energy provider (13) such as a heat blower or dielectric heater directing thermal energy toward the inner surface of said rotor blade.

13. The system (24) according to claim 11, wherein said application means (17) includes a rotor blade detector and/or sensor means (14) such as digital camera and/or transmitter/receiver sensors such as ultrasonic or optical sensor systems.

14. The system (24) according to claim 11, wherein said system comprises a main maintenance unit (8) located outside said rotor blade and wired connection means (11) and/or wireless connection means (11) establishing a data and energy connection between said device (7) and unit (8).

15. The system (24) according to claim 14, wherein said wired connection means (11) comprises at least one data cable for transfer of data communication between the mobile maintenance device (7) and the main maintenance unit (8), and at least one power cable for transfer of electric energy from the main maintenance unit (8) or via the main maintenance unit (8) to the mobile maintenance device (7).

16. The system (24) according to claim 14, wherein said wired connection means (11) includes at least one data cable for transfer of data communication between the mobile maintenance device (7) and the main maintenance unit (8), and/or at least one power cable for transfer of electric energy from the main maintenance unit (8) or via the main maintenance unit (8) to the mobile maintenance device (7), and/or at least one heat tube for transfer of heat energy from the main maintenance unit (8) or via the main maintenance unit (8) to the mobile maintenance device (7), and/or combinations thereof.

17. The system (24) according to claim 11, wherein said mobile maintenance device (7) includes an on-board battery power pack for powering said device (7) and application means (17).

18. The system (24) according to claim 17, wherein said application means (17) comprise electric motors for said moving means (7a) in the mobile maintenance device (7).

19. The system (24) according to claim 11, wherein said mobile maintenance device (7) has storage outside said rotor blade (6) in a non-operational station in the hub, nacelle or other wind turbine places in close proximity of the rotor (5).

* * * * *